United States Patent
Ward

[15] 3,654,550
[45] Apr. 4, 1972

[54] KELVIN DOUBLE BRIDGE WITH ZENER DIODE FAILURE CIRCUIT

[72] Inventor: Robert C. Ward, Winston-Salem, N.C.

[73] Assignee: Western Electric Company, Incorporated, New York, N.Y.

[22] Filed: Oct. 26, 1970

[21] Appl. No.: 84,035

[52] U.S. Cl. .........................................................324/62 R
[51] Int. Cl. ..........................................................G01r 27/02
[58] Field of Search..........................324/62, 63, 64, 65, 119; 323/75

[56] References Cited

UNITED STATES PATENTS

| | | | |
|---|---|---|---|
| 2,974,279 | 3/1961 | Barry et al. | 324/62 |
| 3,495,169 | 2/1970 | Shirk, Jr. et al. | 324/62 |

*Primary Examiner*—Edward E. Kubastewicz
*Attorney*—W. M. Kain, R. P. Miller and W. L. Williamson

[57] ABSTRACT

In a Kelvin four-terminal double bridge circuit with a detector, an avalanche or Zener diode or similar voltage responsive device is connected across a current terminal to an adjoining voltage terminal. The avalanche diode has a breakdown voltage sufficiently smaller than the bridge supply voltage to conduct and cause a definitive change in the detector if the current terminal fails to engage a resistance under test.

2 Claims, 1 Drawing Figure

Patented April 4, 1972
3,654,550
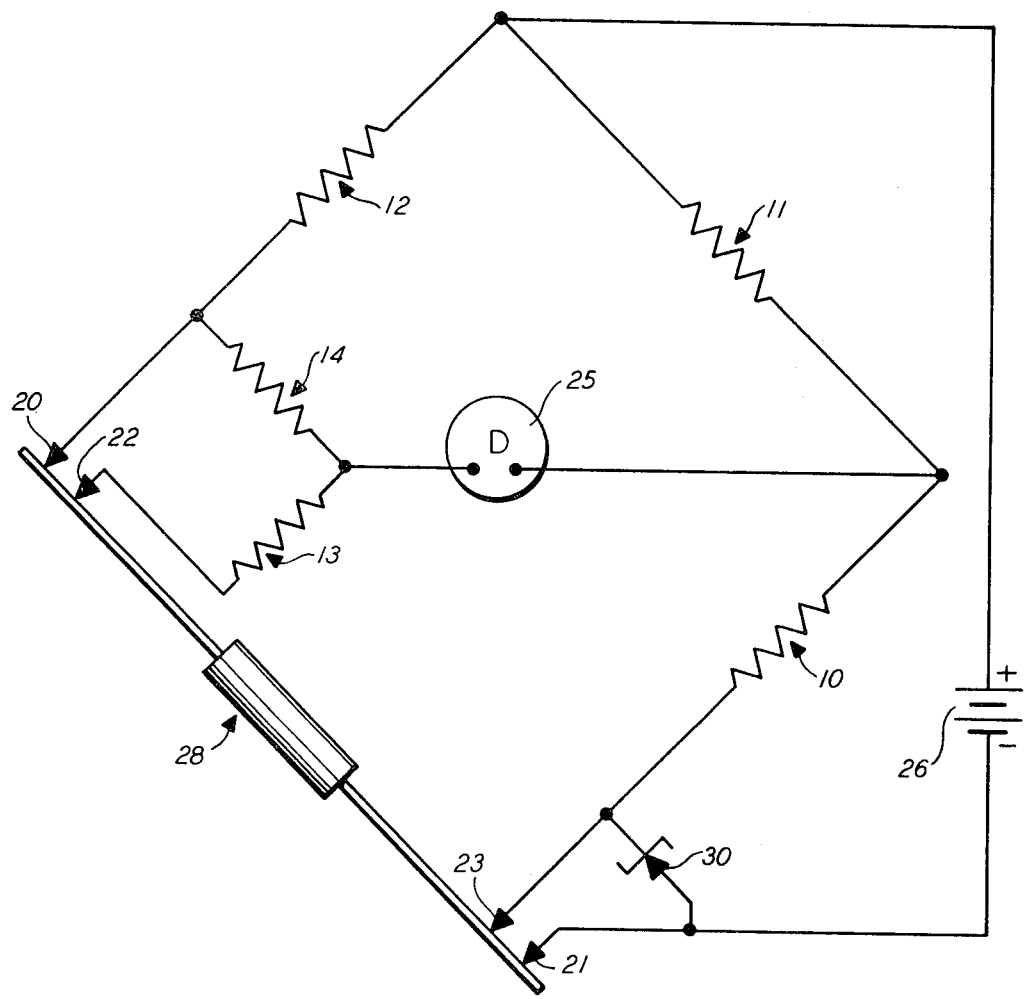
INVENTOR
R. C. WARD
By D. W. Marks
ATTORNEY

KELVIN DOUBLE BRIDGE WITH ZENER DIODE FAILURE CIRCUIT

BACKGROUND OF THE INVENTION

1. Field of the Invention

Bridge circuits are commonly used to test resistances of varying values. For very low resistances or for extreme precision measurements of higher resistances, a Kelvin four-terminal double bridge circuit is generally used. Where the bridge circuit is used in an automatic testing facility, resistances are automatically brought into engagement with the terminals of the bridge circuit. If a resistance under test fails to engage a current terminal of the Kelvin bridge, the detection element in the Kelvin bridge is not changed to indicate the value of the resistance under test. Consequently, the resistance under test may be erroneously accepted. This invention relates to a new and improved Kelvin bridge circuit for indicating a failure when the current terminal fails to engage the resistance.

2. Prior Art.

In the prior art it was generally known to place a high value resistance (relative to the contact resistance) across the current and voltage terminals of the bridge circuit to deflect the detection element and reject the resistance under test in the event that the current terminal did not engage the resistance under test. However, this resistance introduced error into the circuit so that the circuit did not accurately measure the value of the resistance under test.

SUMMARY OF THE INVENTION

An object of the present invention is a new and improved Kelvin bridge circuit for use with automatic testing facilities.

Another object of the invention is a Kelvin bridge circuit which deflects the detector to reject the resistance under test without destroying the accuracy of the Kelvin bridge.

In accordance with these and other objects, the invention contemplates a Kelvin bridge circuit wherein a voltage controlled breakdown device is connected across current and voltage terminals of the bridge. The device is selected to have a breakdown voltage sufficiently less than the voltage source such that the device conducts to cause the detector to indicate a failure in the event the current terminal fails to engage the resistance.

BRIEF DESCRIPTION OF THE DRAWING

In the accompanying drawing there is shown a Kelvin bridge circuit which has been improved by the addition of an avalanche diode across the current and voltage contacts thereof.

DETAILED DESCRIPTION

Referring to the accompanying drawing there are shown resistance arms 10, 11, 12, 13 and 14, terminals 20, 21, 22 and 23, a detector 25, such as a high gain amplifier or galvanometer, and a voltage source 26 connected in a conventional manner as a Kelvin four-terminal double bridge circuit for testing a resistance under test 28. The conventional circuit is improved by a voltage responsive device, such as an avalanche diode 30, sometimes referred to as a Zener diode, connected across terminals 21 and 23 of the bridge circuit. The diode 30 is selected to have a breakdown voltage less than the voltage of the source 26 so that the diode 30 conducts when the terminal 21 fails to engage a resistance under test 28 to deflect the galvanometer 25 to indicate that the resistance under test 28 is not acceptable.

When properly balanced with the ratio of resistance arms 10 and 11 equal to the ratio of resistance arms 13 and 14 (the resistance of arms 10, 11, 13 and 14 including all contact and lead resistances) the bridge circuit balances out contact resistances which may be in the order of the magnitude of the resistance under test. The diode 30 is reverse biased by the voltage source 26 and normally has a very high resistance relative to the resistance arms 10–14 and does not introduce any significant error into the circuit. Without the diode 30, the detector 25 would indicate perfect balance since the voltage source 26 is effectively disconnected when the terminal 21 fails to engage the resistance under test 28. The failure of the terminal 21 to engage the resistance under test 28 could result in an erroneous acceptance of a resistance under test. The diode 30 prevents such an erroneous acceptance of the resistance under test by breaking down and causing current in the bridge circuit to deflect the galvanometer 25 to reject the resistance under test.

The above-described embodiment of the invention is simply illustrative of the principles of the invention and many other embodiments may be devised without departing from the scope and spirit of the invention. For example, the avalanche diode 30 4 may be replaced by other devices which have a high resistance at low voltages and a medium or low resistance at higher voltages. Such devices should generally have a first resistance greater than 10,000 times the contact resistance between terminals 21 and 23 at voltages generally less than 1 volt and a second resistance less than 100 times the contact resistance between terminals 21 and 23 at a voltage less than the supply voltage but greater than 1 volt. What is claimed is:

1. A Kelvin four-terminal double bridge circuit comprising:
   first, second, third and fourth terminals for engaging a resistance under test;
   first, second and third resistance arms serially connected between the first and third terminals;
   fourth and fifth resistance arms serially connected between the first and second terminals;
   a detector connected between the junctions of the fourth and fifth resistance arms and the junction between the second and third resistance arms;
   a voltage source connected between the junction of the first and second resistance arms and the fourth terminal; and
   a voltage responsive device connected between the third and fourth terminals, said voltage responsive device having a first resistance greater than 10,000 times the contact resistance between the third and fourth terminals at voltages less than 1 volt and a second resistance less 100 times the contact resistance between the third and fourth terminals at a voltage less than the supply voltage but greater than 1 volt. 1

2. A Kelvin four-terminal double bridge as defined in claim 1 wherein voltage responsive device is an avalanche diode.

* * * * *